W. F. FOLMER.
CAMERA CARRIAGE.
APPLICATION FILED APR. 25, 1914.
1,196,096. Patented Aug. 29, 1916.
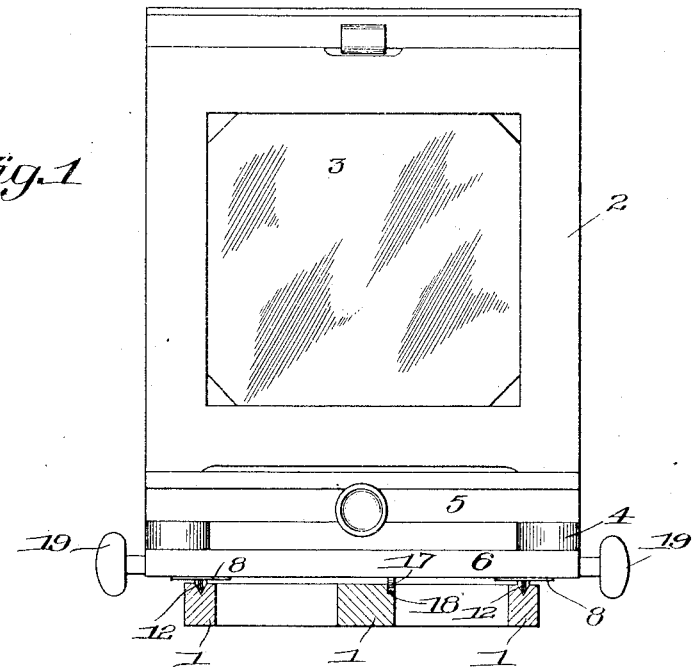
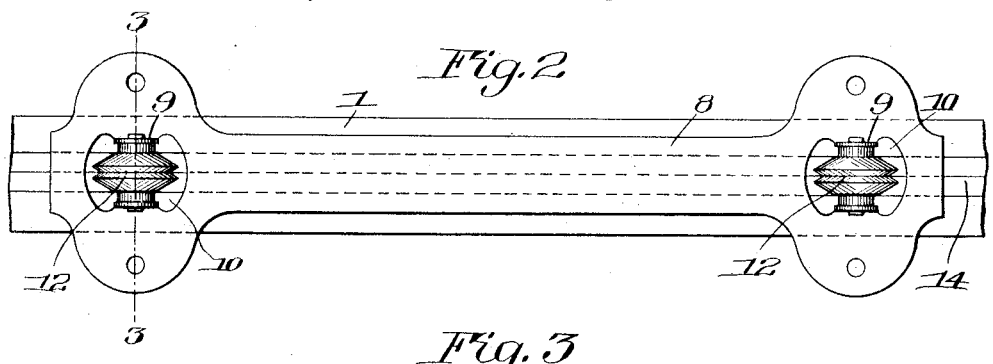
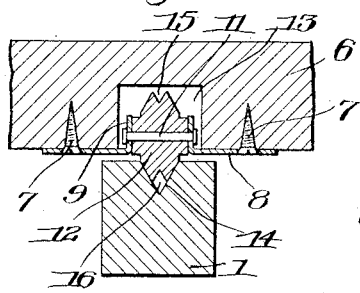
Inventor
William F. Folmer
Witnesses

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

CAMERA-CARRIAGE.

1,196,096.  Specification of Letters Patent.  Patented Aug. 29, 1916.

Application filed April 25, 1914. Serial No. 834,310.

*To all whom it may concern:*

Be it known that I, WILLIAM F. FOLMER, of Rochester, in the county of Monroe and State of New York, have invented certain new and useful Improvements in Camera-Carriages; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide an anti-friction mount for camera carriages whereby they may be moved back and forth on the bed for focusing or other purposes with little effort and with a smooth rolling motion.

A further object is to provide a rolling contact between the parts that will not be interrupted by the lodgment of less than an unusual quantity of dirt or foreign matter in the track of the carriage.

To these and other ends the invention consists in certain improvements and combinations of parts all as will be hereinafter more fully described, the novel features being pointed out in the claim at the end of the specification.

In the drawings: Figure 1 is a rear elevation of a camera and camera bed constructed in accordance with and illustrating one embodiment of my invention, the track or bed being shown in transverse section; Fig. 2 is an enlarged top plan view of the running gear of the carriage and a fragment of the track, and Fig. 3 is a detail section through one of the rollers and its bearings on the line 3—3 of Fig. 2.

Similar reference numerals throughout the several figures indicate the same parts.

The present improvements are particularly useful when embodied in the bulkier types of cameras such as portrait cameras and the larger sizes of view cameras in which either the front board or the back, or sometimes both, are slidably mounted on the bed and moved relatively to effect changes of focus and I have illustrated the invention in connection with such a camera and as embodied in the mounting of the back which carries the sensitized material and the focusing screen or ground glass necessarily make it rather heavy and difficult to move with precision.

Referring more particularly to the drawings, 1 indicates the bed comprising in the present instance three longitudinal rails. Mounted on the bed is the camera casing or back 2 carrying the ground glass 3 and supported on a carriage 4 comprising upper and lower transverse bolsters 5 and 6. Extending longitudinally of the bed and fastened at their ends by screws 7 to the under sides of two of these lower bolsters 6 (only one of which is shown) are two plates 8 having upwardly turned journal lugs 9 at opposite sides of openings 10 therein. Supported in these lugs are axles 11 on which turn rollers 12. The bolsters 6 of the carriage are recessed at 13 to accommodate the lugs and rollers. These rollers 12 rest in V-shaped tracks 14 formed in or otherwise provided upon the two outside rails of the bed 1, the front and rear rollers of the respective plates 8 occupying the respective tracks. The peripheries of the rollers are also V-shaped to conform generally to the tracks, that is, their tread surfaces converge and rest evenly against the inclined sides of the tracks or grooves, giving an extended bearing surface. These tread surfaces do not, however, intersect. On the other hand, the apex of the periphery, is cutaway in each instance by a V-shaped peripheral groove 15 having an inverse relationship to the groove of the track as shown in Fig. 3, or, in other words, intersecting the angle of the bearing surfaces of the roller. In this way a diamond-shaped space 16 is left in the angle of the track. By reason of this space dirt or other foreign matter such as a pin, for instance, lodging in the tracks, will lie in the extreme angle at the bottoms thereof and the rollers will be enabled to pass smoothly over, out of contact and bearing broadly only on the upper inclined sides which are not capable of retaining an obstruction.

The camera may be provided with the usual or any preferred mechanism for propelling it along the bed. In the present instance a transverse shaft carries a pinion 17 meshing with a rack 18 on the central rib of the bed 1 and turned by means of terminal knobs 19 at either side.

I claim as my invention:

The combination with a horizontally disposed bed provided with a groove having converging walls to form a V-shaped track opening upwardly, of a camera carriage movable on the bed and provided with a supporting roller having V-shaped or converging tread surfaces coöperating with the track, said roller being provided with a V-shaped groove on its periphery in inverse relationship to the groove of the track to leave a diamond shaped space in the angle of the track beneath the roller.

WILLIAM F. FOLMER.

Witnesses:
GEO. C. ROCKWELL,
H. J. POTTER.

Copies of this patent may be obtained for five cents each, by addressing the "Commissioner of Patents, Washington, D. C."